March 30, 1937.  H. GRIESEL  2,075,607
MOLDING APPARATUS
Filed April 27, 1932    3 Sheets-Sheet 1
Fig. 1
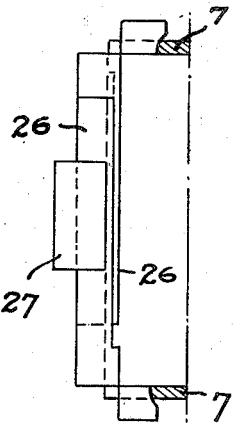
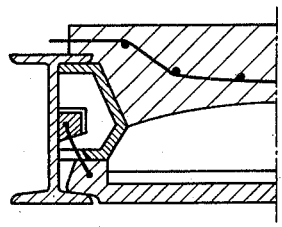
Fig. 2
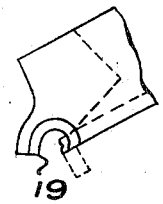
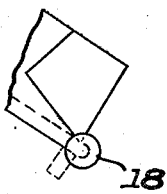
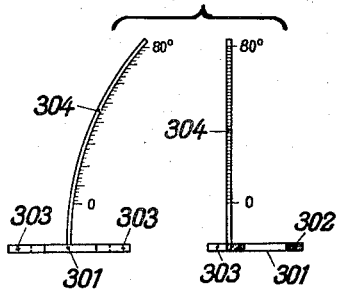
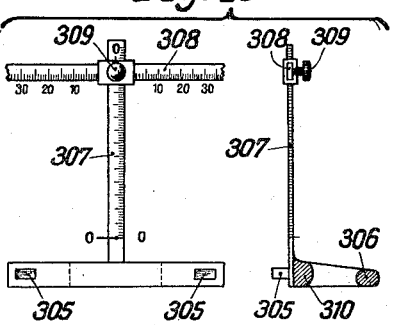
Inventor:
Heinrich Griesel
By Pennie, Davis, Marvin & Edmonds
Attorneys March 30, 1937.  H. GRIESEL  2,075,607
MOLDING APPARATUS
Filed April 27, 1932.  3 Sheets-Sheet 2
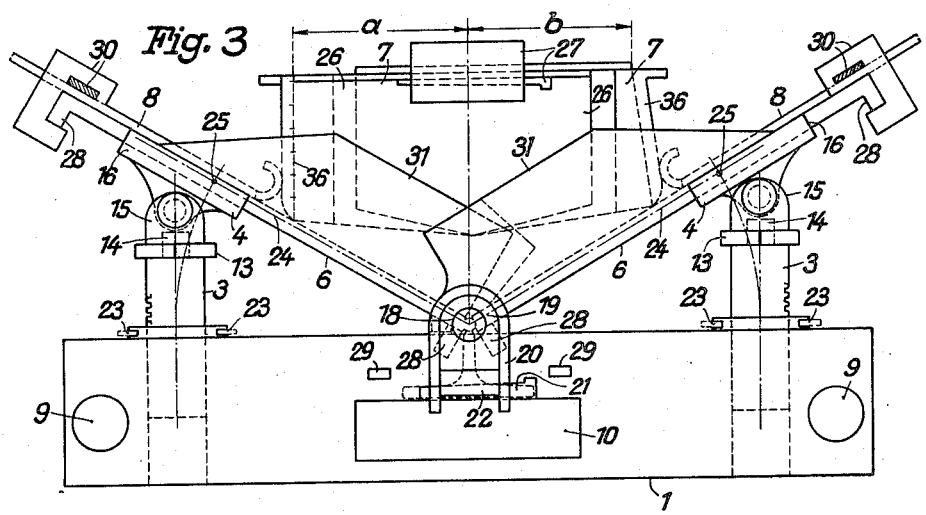
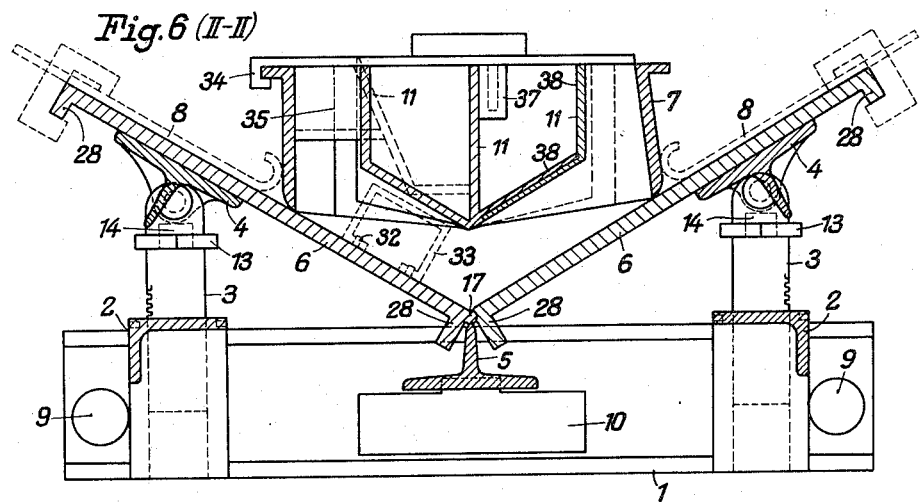
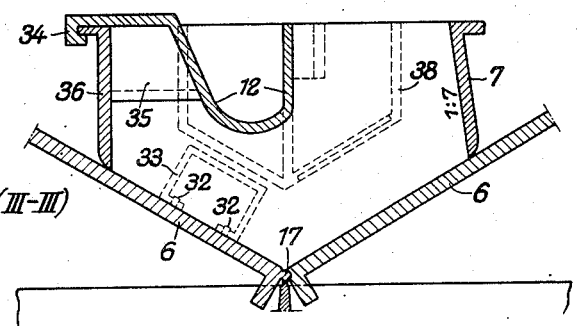
Inventor:
Heinrich Griesel
By Pennie Davis Marvin Edmonds
Attorneys March 30, 1937.   H. GRIESEL   2,075,607
MOLDING APPARATUS
Filed April 27, 1932   3 Sheets-Sheet 3
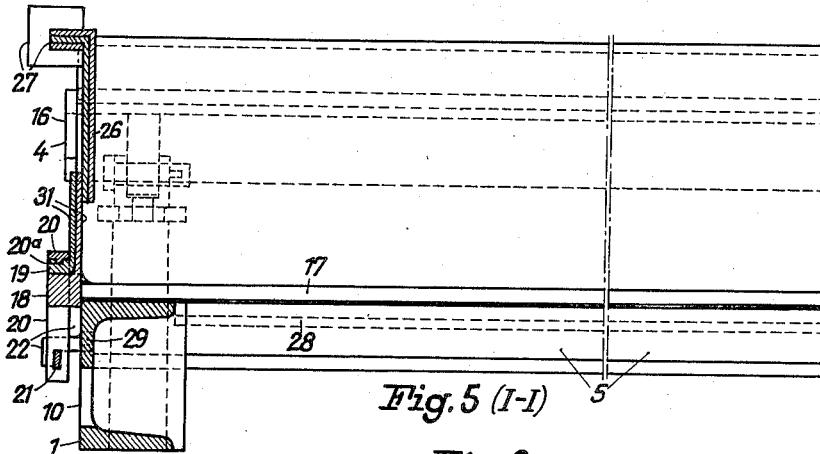
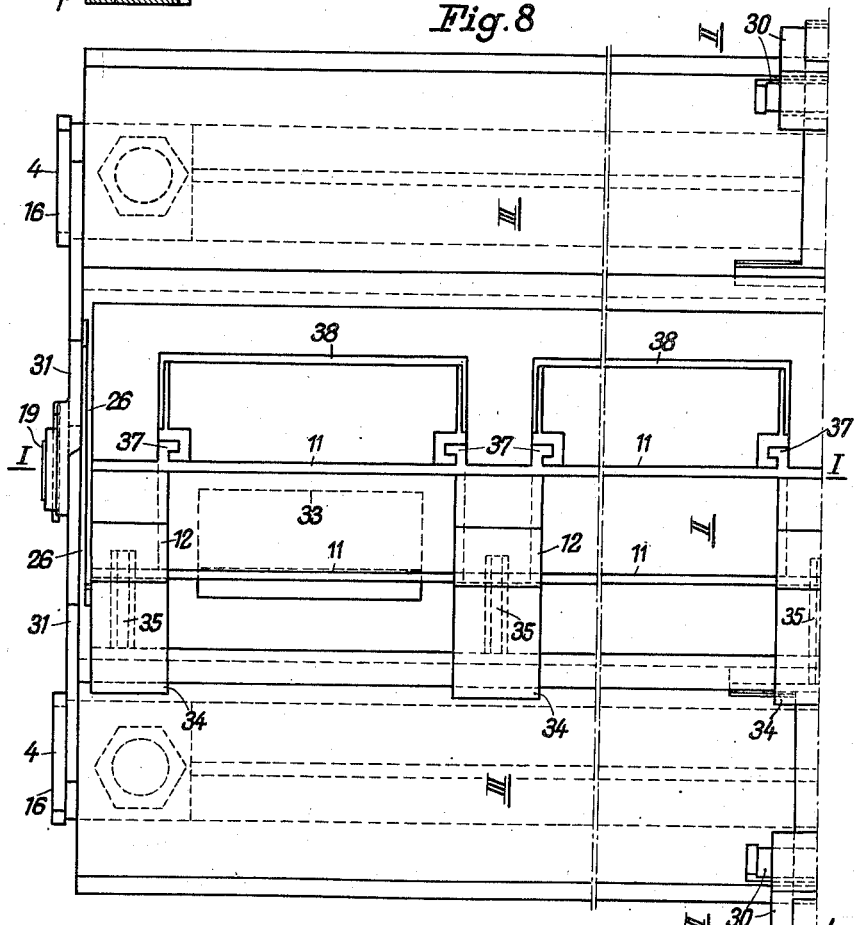

Patented Mar. 30, 1937

2,075,607

UNITED STATES PATENT OFFICE 2,075,607

MOLDING APPARATUS

Heinrich Griesel, Berlin, Germany

Application April 27, 1932, Serial No. 607,727
In Germany April 28, 1931

9 Claims. (Cl. 25—121)

My invention relates to mold arrangements for the manufacture of molded blocks for building and other molding purposes and in particular it is concerned with mold arrangements for the manufacture of artificial stones and slabs for building.

The problem underlying the invention is to provide a mold device which can be varied in all its dimensions and in its configuration i. e., not only are the breadth, length and height to be variable but also the relative angular positions of the walls, the radius of curvature of curved parts of the mold, the configuration of the individual boundary faces and so on.

I attain this in that I provide on a portable base frame a mold base of variable surface configuration and dimensions adjustable to different values and on this base a mold box is erected which is adjustable in itself and the boundaries of which can be altered in form or wholly or in part interchanged in accordance with the desired configuration of the boundary surfaces which they constitute for the molded article being prepared.

With such a mold base consisting in accordance with the invention of individual surfaces, the limiting surfaces of the article to be molded can readily and rapidly be given the desired configuration, e. g., arcuate, plane, angular, flask shaped, rib-like and the like, in consequence of the construction of the surfaces as well as their capacity for being positioned. The magnitude of the mold base limits the dimensions of the base of the molded article which is prepared and the further dimensions in respect of breadth, length and thickness are determined by the adjustment of the mold box. This mold box which is erected on the mold base determines however by its positioning on the mold base, whether disposed symmetrically or non-symmetrically thereon, not only the limiting surface for the base of the mold but also at the same time the further special configuration of the molded article which is to be prepared. As the mold box is in itself adjustable, any desired order of magnitude can be given to the molded body without involving substitute parts or new parts.

For determining the configuration of the limiting surfaces individually, I provide as a further feature of my invention, interchangeable insertions which are also adjustable in themselves, which are utilized where the configuration of the individual surfaces is not attained already by the disposition of the limiting surfaces of the mold device.

With such a single molding device in accordance with my invention it is therefore possible to prepare molded articles, the limiting surfaces and dimensions of which are identical or differ in certain or all respects in accordance with the purpose and the use of the molded article and the static strain it has to bear. By using such molds the cost of maintaining a supply of mold devices in a molding establishment is in consequence very considerably reduced.

Further, due to its construction, the mold device can be readily assembled in a very rapid way and the molded article can also rapidly and readily be removed from the mold; in addition the individual insertions can readily be exchanged for other insertions.

Further features and details of my invention and advantages afforded thereby are set out in the subsequent description and in the drawings which constitute a part of my invention.

Referring to the drawings:

Fig. 1 shows a hollow stone or hollow beam (bearing block or longitudinal beam), Fig. 2 is a sectional view of a ceiling or roof construction in which the hollow stone or beam of Fig. 1 is utilized, Fig. 3 is a front view of a molding device for preparing a building stone as shown in Fig. 1.

Fig. 4a a goniometer for the adjustment of the mold base in section and in elevation, the goniometer being inserted in the arrangement of Fig. 3.

Fig. 4b shows a measuring device for the precise setting of the mold box on the mold base in section and in elevation, this device also being for insertion in the arrangement of Fig. 3.

Fig. 5 shows a half longitudinal section of the mold device along the line I—I of Fig. 8.

Fig. 6 a cross section along the line II—II of Fig. 8,

Fig. 7 a section along the line III—III of Fig. 8,

Fig. 8 shows a half plan view of the mold device,

Fig. 9 shows a plan view of the front wall of the mold box, and

Figs. 10, 11 and 12 show details of the mold device as shown in Fig. 3.

The mold device for manufacturing a hollow stone or beam according to Fig. 1 is preferably made from sheet iron or the like and consists of the lower rectangular rigid base frame which is constructed from two [-shaped beams 1 as transverse supports and two L-beams 2 as longitudinal supports and can readily be constructed to permit of facile assembly and disassembly. This frame carries four adjusting screws 3 with the supporting beams 4 and the centering bar 5 for supporting the plates 6 constituting the base of the mold on which the mold box 7 is mounted. The mold box, consisting of two parts and open top and bottom, is held in the requisite position in the transverse direction of the plates 6 by means of the displaceable bars 8. For reinforcement and for preventing sagging of the plates 6, they are furnished with ribs 28. To enable supporting blocks or longitudinal beams to be prepared in the form of hollow stones with recesses and reinforcing ribs the insertion 11 is inserted into the two-part mold box 7.

To facilitate handling and removing the mold apertures 9 or openings 10 affording a hand grip are provided in the transverse beams 1.

The mold device is assembled in the following manner:

The adjusting screws 3 provided in threaded sleeves on the transverse beams on the base frame have heads 13 firmly secured on the rectangular ends of the stems and are adjusted in accordance with the desired angular position of the plates 6. Then the caps 15 to which the supporting beams 4 are pivotally connected are placed on the round ends 14 of the stems projecting above the rectangular ends of the stems; these caps do not prevent further adjustment of the screws 3 if required. Thereupon the plates 6 are placed on the centering bar 5; the supporting beams 4 automatically assume a position in which their supporting surfaces for the plates 6 are in the same plane as the lower surfaces of the plates to afford the requisite support therefor. In order that the plates should not move laterally on the supporting beams 4 in the longitudinal direction of the mold device, the supporting beams 4 are provided at their ends with lips 16.

Due to the pivot surface 17, the plates 6 are relatively rotatable at their surface of abutment or point of intersection and thus can be set or positioned at any desired relative angle. In order that they should be slidingly held together by means other than their own weight, on both sides one plate is provided with a pin 18 over which engages a corresponding cap 19 on the other plate so that the two plates 6 are held again in position at their ends, Figs. 10 and 11. A yoke 20 provided with a device 20a preventing displacement, engages about the cap 19 and is urged by means of the wedge 21 against the hook 22 on the transverse beam of the base frame and urges the plates 6 against the latter so as to be secured against displacement.

Before the wedge 21 is driven home, the desired angle of the plates 6 is adjusted precisely by means of the adjusting screws 3 using the goniometer, Fig. 4a, which is inserted in the slot 23 and the angular scale of which intersects the line 24 along the arc 25.

As shown in Fig. 4a this goniometer consists of a base 301 provided with projections 303 which are inserted in the slots 23. To facilitate the manipulation of the goniometer a handle 302 is provided. The zero point of the angular frame 304 is so chosen that it coincides with the line 24 when the plate 6 is in the least inclined or horizontal position.

After this precise angular adjustment, the two-part mold box 7 is mounted on the plates 6. This mold box, the overlapping lateral faces 26 of which can be slid together or extended in accordance with the requisite height of the block or longitudinal beam which is to be prepared, is previously set at the desired width by means of the wedge connection 27.

The precise setting of this mold box 7 which has ribs at the top for reinforcement, is effected on the plates 6 by means of a measuring device which can be inserted with its foot in the slots 29.

Such a measuring device is shown in Fig. 4b. It consists of a foot portion 310 provided with projections 305 by means of which the measuring device engages in the slots 20. A handle 306 is provided to facilitate manipulation. A horizontal scale 308 is slidable on the vertical scale 307 and can be adjusted in the vertical direction. By means of a set screw 309 this scale can be fixed in the desired position. The zero line of the horizontal scale of this measuring device lies precisely in the vertical line through the point of intersection of the plates 6 and the zero point of the vertical scale 307 coincides with the point of intersection of the inner surface of the plates 6. By means of this measuring device the distances $a$ and $b$ as well as the position of the mold box in respect of height, and thus at the same time the thickness of the building stone of Fig. 1, can be measured so that the thickness can be precisely set.

After this setting the retaining members 8 are advanced against the mold box 7 and secured by their wedge connections 30. By means of these retaining devices 8, the mold box 7 is maintained on the plates 6 (mold base) so as to be non-displaceable in the transverse direction of the mold device; at their ends the retaining devices are appropriately shaped so that the mold box 7 does not jump out should there be any jolting of the mold device. The surfaces of the longitudinal walls of the mold box do not need to be vertical but may be of any suitable inclination corresponding to that of the flanges of the beams or rafters.

The closure of the lower part of the mold box 7 at its end surfaces is effected on both ends of the end faces of the plates 6 by the overlapping side surfaces 31 so that at all angular positions of the mold base a hollow cavity closed on all sides and with the requisite boundaries is obtained on the mold base for the manufacture of the longitudinal beams or bearing blocks according to Fig. 1. These two side surfaces 31 prevent moreover that the mold box 7 should be displaced in the longitudinal direction of the mold device.

Boxes 33 may be positioned on pins 32 on the plates 6 for forming apertures for hand grips in the longitudinal beams or bearing blocks.

In addition to the insertion 12 for forming recesses, e. g., for the auxiliary anchoring beams of the ceiling plate according to Fig. 2, which is held against the longitudinal wall 36 of the mold box 7 by means of the hook 34 and the box 35, withdrawable hollow shells 38 are suspended in the mold box by means of the hooks 37 and so the whole insertion 11 is complete in order to enable the hollow beams or bearing blocks to be made as hollow stones. The boxes 35 at the same time give rise to slots which in this case for example can serve for the flexible connection between the ceiling plate and its auxiliary anchoring beams.

In order that the breadth of the longitudinal boundary faces of the beams or bearing blocks which are being prepared may be read off, the inner surfaces of the mold box are provided with a scale as indicated in Fig. 3.

To remove the complete longitudinal beam or bearing block from the mold, the wedge connections 30 of the mold device are released; then in most cases the mold box 7 can be lifted without having to loosen the wedge connection 27 and the finished longitudinal beam or bearing block can then be removed.

I claim:

1. A mold device comprising a sectional mold member, at least one of the sections forming the mold member being adjustable to the vertical, and an adjustable mold box on said mold member comprising replaceable sections, whereby other sections may be substituted to vary the configuration of the molded article.

2. A mold device comprising a base frame, a sectional mold base adjustably mounted on said base frame, at least one of the sections forming the mold base being adjustable to the vertical, and a mold box on said base member, said mold box being adjustable and comprising replaceable sections, whereby other sections may be substituted to vary the configuration of the molded article.

3. A mold device comprising a base frame, a mold base adjustably mounted on said base frame and having sides adjustable to the vertical, and a mold box on said mold base, said mold box including replaceable parts and being adjustable as to size and as to relative position with respect to said mold base, whereby articles of various configurations may be molded.

4. A mold device comprising a mold base and a mold box on said mold base, said mold box including two members adjustably mounted with respect to each other and having overlapping faces, said overlapping faces being adapted to maintain the lateral surfaces of the mold box closed when said members are moved within the limits of adjustment.

5. A mold device comprising a base frame, a mold base detachably mounted on said base frame, a mold box on said mold base, said mold box having transverse and longitudinal limiting surfaces, at least one of said surfaces being adjustable, said mold base being hinged and adjustable to positions oblique with respect to the vertical, and means for securing said mold base in its various positions of adjustment.

6. A mold device comprising a base frame, a mold base on said base frame, said mold base comprising a pair of members hingedly and releasably connected together, said members being adjustable with respect to the vertical, means for securing said members in a desired angular position, and a mold box on said mold base, said mold box including replaceable parts and being adjustable whereby articles of various configurations may be molded.

7. A mold device comprising a base frame, a centering bar carried by said base frame, a mold base on said base frame, said mold base comprising a pair of members hingedly and releasably connected together, said members being adjustable with respect to the vertical, the hinge connection between said members resting on said centering bar, and means for holding the hinge connection between said members in position on said centering bar.

8. A mold device comprising a base frame, a mold base on said base frame, a pair of limiting surfaces carried by said mold base, said mold base comprising a pair of members hingedly and releasably connected together, said members being adjustable with respect to the vertical, and means having pivoted sections engaging said hingedly connected members for adjusting said members with respect to the vertical.

9. A mold device comprising a base frame, a mold base adjustably mounted on said base frame, said mold base having overlapping limiting surfaces at opposite sides for maintaining the ends of the cavity in the mold base closed, a mold box on said mold base, said mold box comprising a pair of members adjustably mounted with respect to each other and having overlapping surfaces forming opposite sides thereof, said overlapping surfaces being sufficiently close to maintain the sides of the mold box closed when the adjustable members are moved within their limits of adjustment.

HEINRICH GRIESEL.